(12) United States Patent
Müller

(10) Patent No.: US 12,265,694 B2
(45) Date of Patent: Apr. 1, 2025

(54) SAFE CLOSING OF POP-UP WINDOW

(71) Applicant: AGCO International GmbH, Neuhausen (CH)

(72) Inventor: Adalbert Müller, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 51 days.

(21) Appl. No.: 18/062,529

(22) Filed: Dec. 6, 2022

(65) Prior Publication Data
US 2023/0195286 A1 Jun. 22, 2023

(30) Foreign Application Priority Data
Dec. 21, 2021 (GB) ..................................... 2118587

(51) Int. Cl.
*G06F 3/00* (2006.01)
*G06F 3/0481* (2022.01)
*G06F 3/0484* (2022.01)

(52) U.S. Cl.
CPC .......... *G06F 3/0484* (2013.01); *G06F 3/0481* (2013.01)

(58) Field of Classification Search
CPC .............................. G06F 3/0481; G06F 3/0484
See application file for complete search history.

(56) References Cited

U.S. PATENT DOCUMENTS

| | | | |
|---|---|---|---|
| 10,969,947 B2 | 4/2021 | Chudzinski | |
| 2008/0288876 A1* | 11/2008 | Fleming | G06F 3/167 715/761 |
| 2010/0090712 A1* | 4/2010 | Vandermeijden | G06F 3/04166 702/150 |
| 2017/0113548 A1* | 4/2017 | Lucas | G06F 3/04842 |
| 2018/0136619 A1* | 5/2018 | Dao | G06F 3/0482 |
| 2019/0384480 A1 | 12/2019 | Lee et al. | |
| 2021/0276420 A1 | 9/2021 | Couch et al. | |
| 2023/0016842 A1* | 1/2023 | Eckelberg | E02F 9/2025 |
| 2023/0126656 A1* | 4/2023 | Lu | H04N 7/147 348/14.03 |

OTHER PUBLICATIONS

UK Intellectual Property Office, Search report for related UK Application No. GB2118587.1, dated Jun. 14, 2022.

* cited by examiner

*Primary Examiner* — Brett A Feeney
*Assistant Examiner* — Andrew Chung

(57) ABSTRACT

A console for controlling an agricultural machine having a screen, wherein the screen is configured to display a first graphical user interface with at least a first virtual element for controlling a machine function, and to display a second graphical user interface overlapping at least partially the first virtual element. The console is configured to prevent an execution of the machine function assigned to the first virtual element of the first graphical user interface, wherein the execution of the machine function assigned to the first virtual element is prevented after an overlap of the first virtual element by the second graphical user interface was cancelled.

11 Claims, 5 Drawing Sheets

SAFE CLOSING OF POP-UP WINDOW

FIELD

The present disclosure relates generally to a vehicle console with a screen to display overlapping graphical user interfaces and a method for safe interaction with overlapping graphical user interfaces.

BACKGROUND

A vehicle, for example an agricultural machine as a tractor, a combine, a harvester, a sprayer, etc., can comprise a console to be operated by a user to control the vehicle. The console can comprise a screen, e. g. a touch sensitive screen, to display a graphical user interface for interacting with the user. The graphical user interface can comprise several virtual elements representing a function. If the user selects the function, e. g. by tipping his finger on a virtual element, the console recognizes the user interaction and executes the function represented by the virtual element. The function can be any vehicle function, e. g. functions to control the vehicle interior, functions to control a navigation system, functions to control an infotainment system, etc., as well as any control function of an implement connected to the vehicle.

The functions as well as additional content as user information, status indicators, etc., can be grouped in different graphical user interfaces, wherein the corresponding graphical user interface is displayed on the screen when needed. For example, if the function to control the vehicle interior is called an additional graphical user interface can be displayed on the screen to display functions and content related to the vehicle interior, as switching lights on/off, regulating of brightness of the lights, regulating of air conditioning, etc. The different graphical user interfaces can be displayed in various arrangements on the screen, e. g. a graphical user interface overlapping another graphical user interface (e. g. in terms of a pop-up window).

The overlapping graphical user interface is displayed on the screen as long as needed and can be closed by a user interaction or automatically by the console. But when the overlapping graphical user interface is closed an unintended execution of a function of the overlapped graphical user interface can occur if a user interaction to execute a function of the overlapping graphical user interface and the closing of the overlapping graphical user interface occur nearly simultaneously. I. e., the user is about to move his finger to a virtual element of the overlapping graphical user interface representing a function intended to be executed by the user while the overlapping graphical user interface is displayed but the user tips the touch sensitive screen with his finger just after the closing of the overlapping graphical user interface so that a virtual element of the overlapped graphical user interface representing a different function is selected instead of the intended function of the overlapping graphical user interface.

SUMMARY

It is an objective to provide a console with a screen for displaying overlapping graphical user interfaces configured for a safe user interaction with overlapping graphical user interfaces to avoid the execution of unintended functions, e. g. at the moment when an overlapping graphical user interface is closed.

According to an aspect of the invention there is provided a console for controlling an agricultural machine comprising a screen. The screen is configured to display a first graphical user interface with at least a first virtual element for controlling a machine function and to display a second graphical user interface overlapping at least partially the first virtual element. The console is configured to prevent an execution of the machine function assigned to the first virtual element of the first graphical user interface, wherein the execution of the machine function assigned to the first virtual element is prevented after an overlap of the first virtual element by the second graphical user interface was cancelled.

The agricultural machine can be any vehicle or combination of a vehicle and an implement or tool applicable for operations in an agricultural field as a tractor towing an implement as a plough, a forage harvester, a combine, a sprayer, etc. The console can be used as a human machine interface (HMI) to control the machine and to execute functions of the machine. The console can comprise several input elements as levers, a joystick, buttons, knobs, etc. which can be manipulated by a user. The screen of the console can be used as a visual user interface to display virtual elements representing different machine functions, information and other contents. A virtual element can be an icon, a pull down menu or a graphical button for example.

The virtual elements, the information and the other content can be arranged in different graphical user interfaces (GUI) wherein one graphical user interface can overlap another graphical user interface. For example a first graphical user interface can be display in a first window and a second graphical interface can be displayed in a second window. For execution of a machine function, a virtual element can be selected by one of the input elements, e. g. by pressing a button or moving a cursor with the joystick to the virtual element and selecting it. In addition, the screen can be touch sensitive so that a machine function displayed on the screen can be selected by tipping a finger on the corresponding virtual element representing the machine function.

The console can prevent an execution of the machine function assigned to the first virtual element displayed in the first graphical user interface, for example, by ignoring a selection of the first virtual element. The execution of the machine function assigned to the first virtual element can be prevented when the first virtual element is overlapped by the second graphical user interface but latest when the overlap of the first virtual element by the second graphical user interface was cancelled. Thus, a virtual element of the overlapping second graphical user interface can be selected as long as the second graphical user interface is displayed on the screen. But an unintentional execution of the machine function assigned to the first virtual element being part of the first graphical user interface can be effectively avoided even when the second graphical user interface has been cancelled just before the user was about to select the virtual element of the second graphical user interface.

The overlap of the first graphical use interface, respectively the first virtual element can be cancelled for example by closing the window displaying the second graphical user interface. The closing of the window can be triggered by the user or automatically by the console.

The execution of the machine function assigned to the first virtual element can be prevented until a detection of an event for enabling the machine function assigned to the first virtual element. I. e., after the console recognized the event for enabling the machine function assigned to the first virtual element a selection of the machine function assigned to the first virtual element is no longer be ignored.

The event for enabling the machine function can be an elapse of a timer. The timer can be parametrized by the user to define a time value to be elapsed before the execution of the machine function is enabled. Appropriate time values can be any time values, e. g. a value between 250 milliseconds (ms) and 2 seconds (s).

The machine function assigned to the first virtual element can be configured to control a tool connected with the agricultural machine. The tool can be replaceable and can be an agricultural implement as for example a baler, a sprayer, a weeder, a mower, etc. Alternatively, the tool can be any other controllable device of the vehicle such as a hitch of a tractor.

The console can be configured to assign a second machine function to the first virtual element, and to enable an execution of the second machine function assigned to the first virtual element after an overlap of the first virtual element by the second graphical user interface was cancelled. Thus, the execution of the first machine function can be prevented whereas a selection of the first virtual element to execute a different function is enabled. The execution of the second machine function can be disabled if the event for enabling the first machine function assigned to the first virtual element is recognized by the console to enable the first machine function again.

The first machine function can be assigned to the first virtual element if a first tool is connected with the agricultural machine and the second machine function can be assigned to the first virtual element if a second tool is connected with the agricultural machine. Both tools can be replaceable and can be an agricultural implement. Thus, the first virtual element can be selected to control the second tool if the execution of the first machine function is prevented and to control the first tool if the execution of the first machine function is enabled.

The console can be configured to detect an external event triggered outside of the console wherein the second graphical user interface can be closed when the external event is detected.

The device or tool can be connected with the console, e. g. via a wireless radio link. The device or tool can send a message or a status information to the console to be displayed on the screen of the console as an overlapping second graphical user interface. For example, an incoming call from a calling party can be displayed showing the name and the phone number of the calling party, or a warning message from the tool can be sent to the console and displayed as an overlapping second graphical user interface.

The device or tool can send a signal as an external event triggered outside of the console to the console to close the second graphical user interface overlapping the first graphical user interface. For example, the calling party hangs up the call. Then, the console determines that the call has been terminated and closes the overlapping second graphical user interface showing the name and the phone number of the calling party. Analogously, a signal sent from the tool to the console can be interpreted as an external event, e. g. a signal indicating that the cause of the warning message has been solved to stop displaying the warning message. So in general, the external event can be any signal, e. g. a communication signal, sent from a device or tool to the console and received by the console.

The console can comprise a proximity sensor for a touchless interaction with the screen, wherein the second graphical user interface can be closed when the proximity sensor detects a trigger to close the second graphical user interface.

I. e., the user doesn't need to wait that the second graphical user interface will be closed automatically. Instead, the user can manually close the second graphical user interface overlapping the first graphical user interface. The proximity sensor detects the intention to close the second graphical user interface before the user touches the touch sensitive screen if the finger is close enough to the screen. If the user moves his finger closer to the screen he could unintentionally touch the screen just after the closing of the second graphical user interface and select a virtual element of the first graphical user interface. But the execution of the function represented by the virtual element is avoided since the execution is prevented by the console after the closing of the second graphical user interface overlapping the first graphical user interface.

The screen can be configured to detect a touch on the screen wherein the execution of the machine function assigned to the first virtual element can be enabled if the execution is triggered by a trigger different to a touch on the screen.

Thus, a touch of the touch sensitive screen is interpreted by the console as an unintentional selection of the first virtual element whereas the any other trigger is interpreted as intentional.

The console can comprise an additional input element to which the machine function of the first virtual element is assigned to wherein the trigger different to a touch on the screen for execution of the machine function can be an operation of the additional input element.

I. e., an execution of the function of the first virtual element is prevented by the console only if the user touches the touch sensitive screen but can still be executed if the user selects or triggers the same function by one of the other input elements of the console as the joystick, the buttons, etc.

The overlap of the first virtual element by the second graphical user interface can be cancelled by moving the second graphical user interface out of the area of the first virtual element.

I. e., the overlap can be cancelled without closing the second graphical user interface to display both the first and the second graphical user interface simultaneously on the screen.

The screen can be configured to display a second virtual element of the second graphical user interface overlapping at least partially the first virtual element wherein the execution of the machine function assigned to the first virtual element is prevented if an overlap of the first virtual element by the second virtual element was cancelled by the cancellation of the overlap.

Since the area of the second virtual element is typically smaller than the area of the second graphical user interface the effective area of the first graphical user interface overlapped by the second virtual element is smaller accordingly. Thus, the number of executable machine functions each represented by a separate virtual element in the first graphical user interface can be raised since less machine functions will be affected by the prevention due to the smaller effective area of overlap.

According to an aspect of the invention there is provided a method for preventing an unintended execution of a machine function comprising the steps of displaying a first graphical user interface on a screen, detecting an event for displaying a second graphical user interface, determining an overlap of at least a virtual element of the first graphical user interface representing a machine function by the second graphical user interface, securing the at least one virtual element of the first graphical user interface, displaying the second graphical user interface, detecting an event for closing the second graphical user interface, detecting an event for enabling the at least one secured virtual element, and enabling the at least one secured virtual element.

The method can be a computer implemented method. The method can comprise additional steps as closing the second graphical user interface, or less steps. The order of the steps can be changed, for example, the securing of the at least one virtual element of the first graphical user interface can be executed after the detecting of the event for closing the second graphical user interface. The console can comprise a controller configured to carry out the method mentioned above.

BRIEF DESCRIPTION OF THE DRAWINGS

Several aspects of the invention will now be described, by way of example only, with reference to the accompanying drawings, in which.

DETAILED DESCRIPTION

Figure 1:
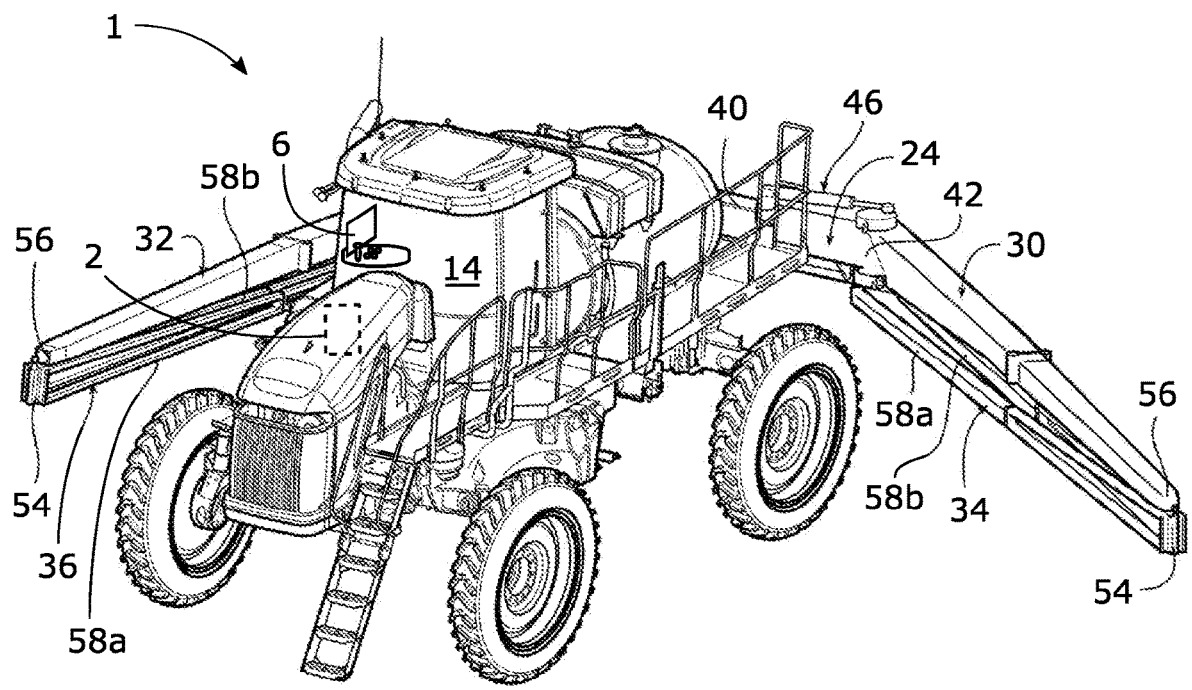
FIG. 1 shows an agricultural machine comprising a console.

FIG. 1 shows an agricultural machine 1 in terms of a vehicle with an attached tool in terms of a spray assembly. Such kind of agricultural vehicle is disclosed in US patent publication US 2015/0201552 A1, by Petrus H. J. Bouten, published on 23$^{rd}$ of July 2015, which is incorporated by reference hereby. Although other type of vehicles and/or tools or implements could be used the following disclosure refers to the vehicle mentioned above by way of example.

The vehicle 1 has a pivot hinge boom assembly 24. The pivot hinge boom assembly 24 is attached to a chassis of the vehicle 1. The pivot hinge boom assembly 24 includes load carrying arms such as left crane arm 30 and right crane arm 32. The pivot hinge boom assembly 24 also includes nozzle carrying arms such as left nozzle arm 34 and right nozzle arm 36. The left and right crane arms 30, 32 are pivotally attached to a central support bar 40 at pivot hinges (see pivot hinge 42 in FIG. 1). Hydraulic cylinders 46 control pivoting movement of crane arms 30, 32 about pivot axes of the corresponding pivot hinges. Thus, the pivoting motion of crane arms 30, 32 occurs in a plane substantially parallel to a ground surface under vehicle 22. Hydraulic cylinders 46 can be actuated by a user seated in cab 14 of vehicle 1 operating a console 6 or by a programmed or programmable control unit 2. The control unit 2 can be part of the console 6.

A hinge joint 54 of each nozzle arm 34, 36 is attached at an end 56 of each crane arm 30, 32. The hinge joint 54 joins two sections 58 of each nozzle arm 34, 36, labeled as inner section 58a and outer section 58b. One or both of sections 58 can swing about a pivot axis to allow nozzle arms 34, 36 to unfold. The inner section 58a of left nozzle arm 34 is opening from the stowed configuration by pivoting about the pivot axis of hinge joint 54. Such movement can be selectively controlled by mechanisms including hydraulic and electric actuators, for example. Such control can be input by a user seated in cab 14 of vehicle 1 operating the console 6 or by the programmed or programmable control unit 2.

Figure 2:
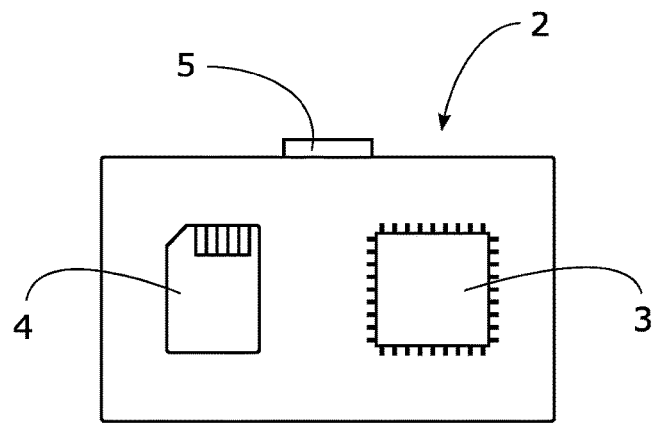
FIG. 2 shows a control unit for carrying out a method.

As shown in FIG. 2, the control unit 2 comprises a controller 3, a memory 4 and an interface 5. The memory 4 contains data and executable programs (computer-implemented procedures or methods) that can be retrieved, processed and executed by the controller 3. The controller 3 can also send or receive data or signals via the interface 5 and store the data or signals in the memory 4. For example, the controller 3 can receive signals form the console 6 or external events triggered outside of the console 6. The controller 3 can also generate control signals to control actuators of the vehicle 1 such as the hydraulic and electric actuators of the spray assembly.

Figure 3:
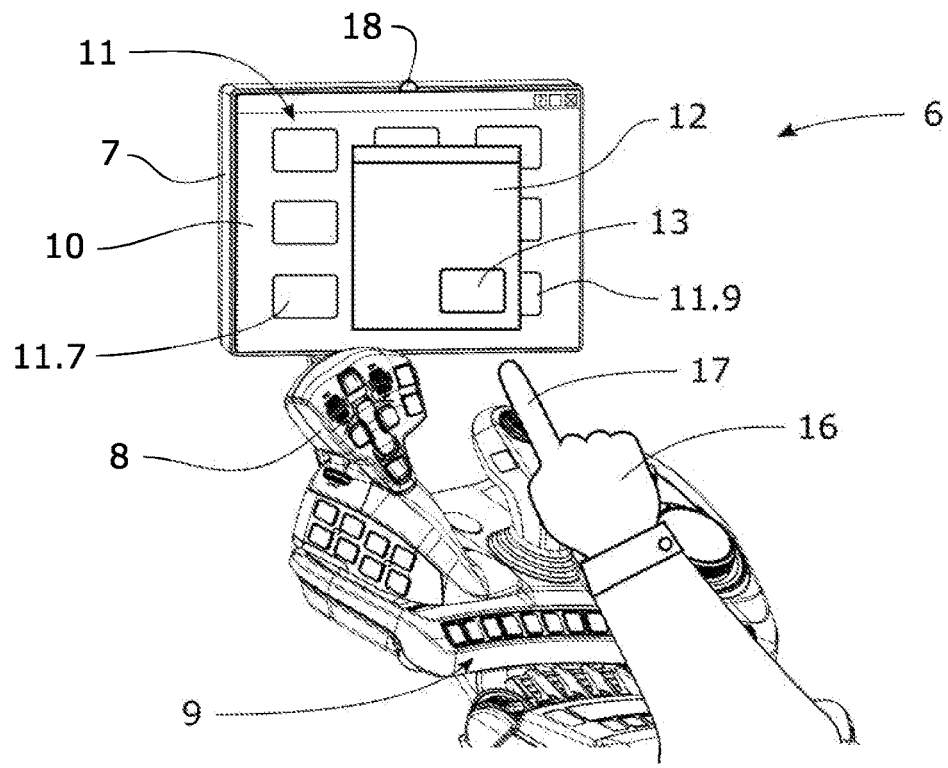
FIG. 3 shows the console.
Figure 4:
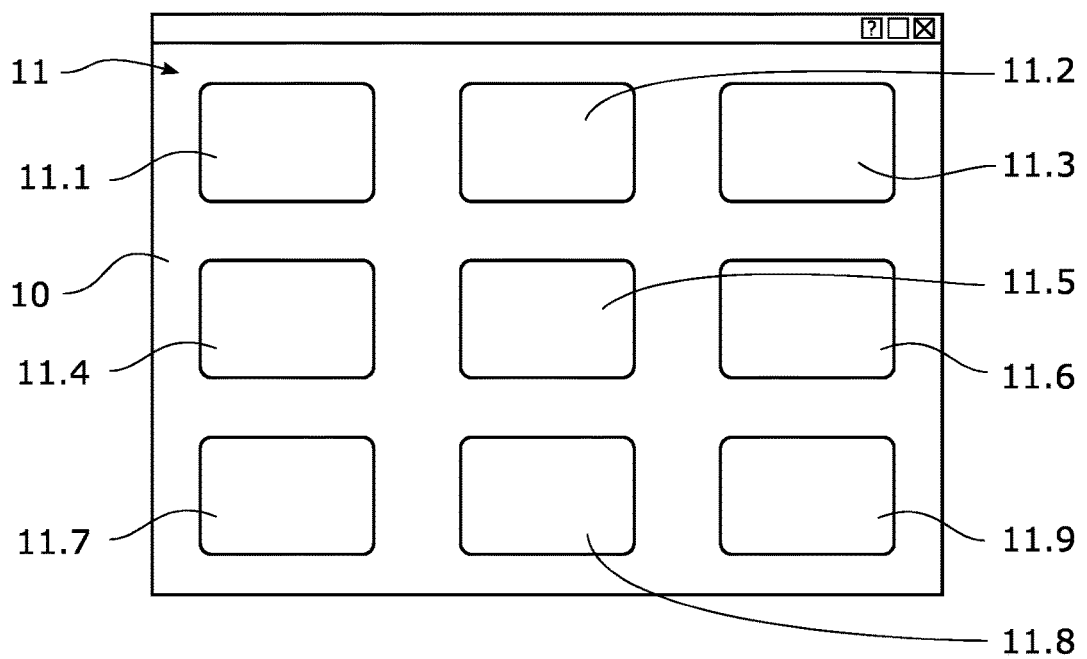
FIG. 4 shows a first graphical user interface.
Figure 5:
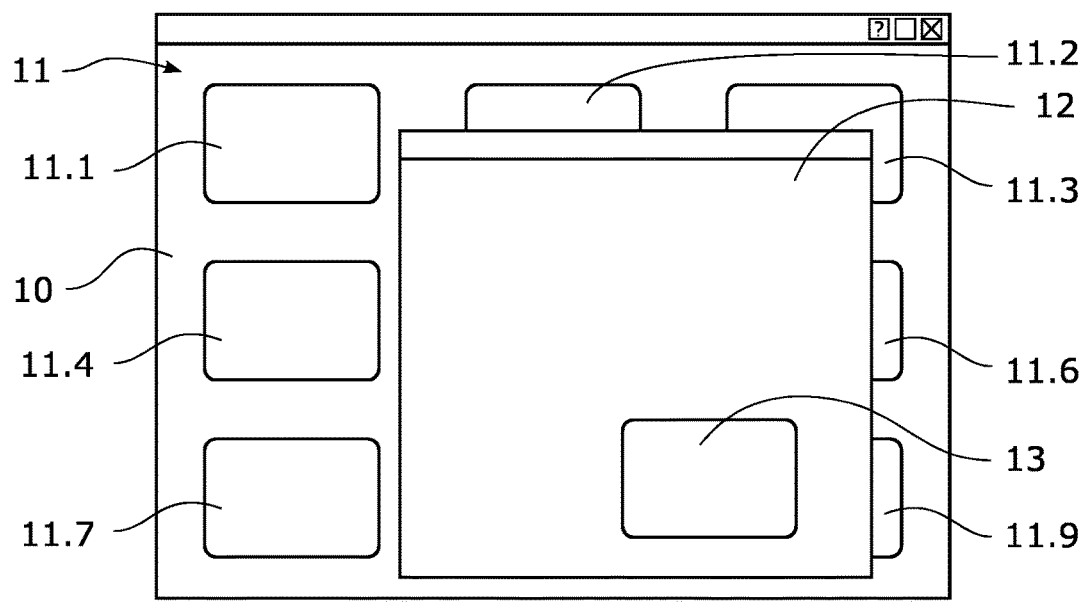
FIG. 5 to FIG. 7 show the first graphical user interface overlapped by a second graphical user interface.

FIG. 3 shows the console 6 comprising a screen 7, multiple input elements as a joystick 8 and buttons 9 and a proximity sensor 18 to detect a finger 17 or a human hand 16 approaching the screen 7. The screen 7 is touch sensitive and recognizes a tipping of the finger 17 on the surface of the screen 7. The screen 7 is shown in FIG. 4 and FIG. 5 in more detail. As depicted in FIG. 4, the screen 7 displays a first graphical user interface 10 comprising several virtual elements 11 as virtual elements 11.1 to 11.9. As depicted in FIG. 3 and FIG. 5, the screen 7 displays the first graphical user interface 10 as shown in FIG. 4 and a second graphical user interface 12 overlapping the first graphical user interface 10. The second graphical user interface 12 comprises at least a virtual element 13. Each virtual element 11.1 to 11.9 and 13 represents a machine function. The machine function can be selected by the user if he tips his finger 17 on the corresponding virtual element 11.1 to 11.9 or 13. The selection of the virtual element is recognized by the controller 3. Then, the controller 3 initiates or executes the function represented by the virtual element. For example, the machine function of the virtual element 11.7 can trigger the corresponding actuator to unfold the left nozzle arm 34 and the machine function of the virtual element 11.9 can trigger the corresponding actuator to unfold the right nozzle arm 36.

All functions represented by the virtual elements 11.1 to 11.9 and 13 can additionally be assigned to the buttons 9. I. e., the left or the right nozzle arms 34 and 36 can be unfolded by pressing one of the buttons 9. By pressing a different button, the left or the right nozzle arms 34 and 36 can be folded. The joystick 8 can be operated by the user to drive the agricultural machine 1, e. g. to accelerate, steer and brake.

The proximity sensor 18 of the console 6 (see FIG. 3) recognizes when the user moves his hand 16 or his finger 17 towards the screen 7. If the hand 16 or the finger 17 comes close enough to the screen 7 a virtual element 11, 13 can be selected to execute the machine function assigned to it without getting in contact with the screen 7.

Figure 8:
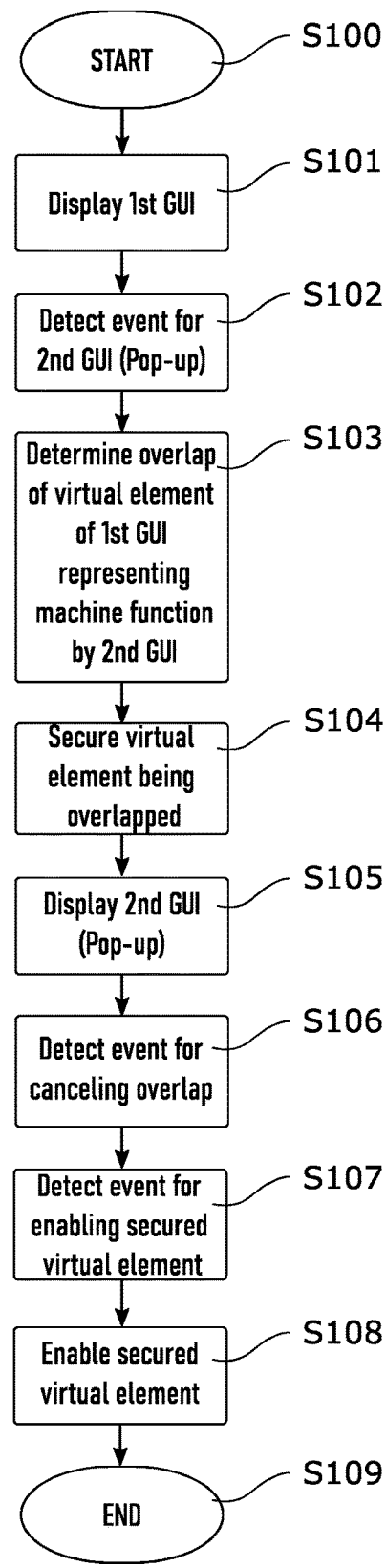
FIG. 8 is a flow diagram illustrating a method for a safe interaction with overlapping graphical user interfaces for preventing an unintended execution of a machine function.

FIG. 8 shows a method for a safe interaction with overlapping graphical user interfaces for preventing an unintended execution of a machine function. The method can be stored in the memory 4 of the control unit 2 as a computer implemented method and carried out by the controller 3 of the control unit 2.

The method starts with step S100 and proceeds to step S101 to display the first graphical user interface 10, as shown in FIG. 4, on the screen 7 of the console 6. All virtual elements 11 of the first graphical user interface 10 are visible for the user and can be selected to execute a machine function assigned to the corresponding virtual element as described above.

The method proceeds to step S102 to detect an event for displaying the second graphical user interface 12, as shown in FIG. 5, on the screen 7. I. e., the second graphical user interface 12 can be displayed as a pop-up window if a specific condition is fulfilled. For example, the event can be an error detected by the control unit 2, e. g. if the unfolding of the nozzle arms 34, 36 fails, to display a warning message in the second graphical user interface 12. The event can be the selection of one of the virtual elements 11 recognized by the controller 3 to display additional functions or virtual elements 13 and contents related to the selected virtual element in terms of a submenu in the second graphical user interface 12. For example, the second graphical user interface 12 displayed as submenu can comprise several functions to control the pivot hinge boom assembly 24. The event can be an external phone call from a calling party. The event can be recognized by the controller 3 to display details of the incoming call as the phone number, the name of the calling party, etc. in the second graphical user interface 12. Alternatively, any other event can be detected by the control unit 2, respectively by the controller 3 to display content related to the event in the second graphical user interface 12.

Figure 7:
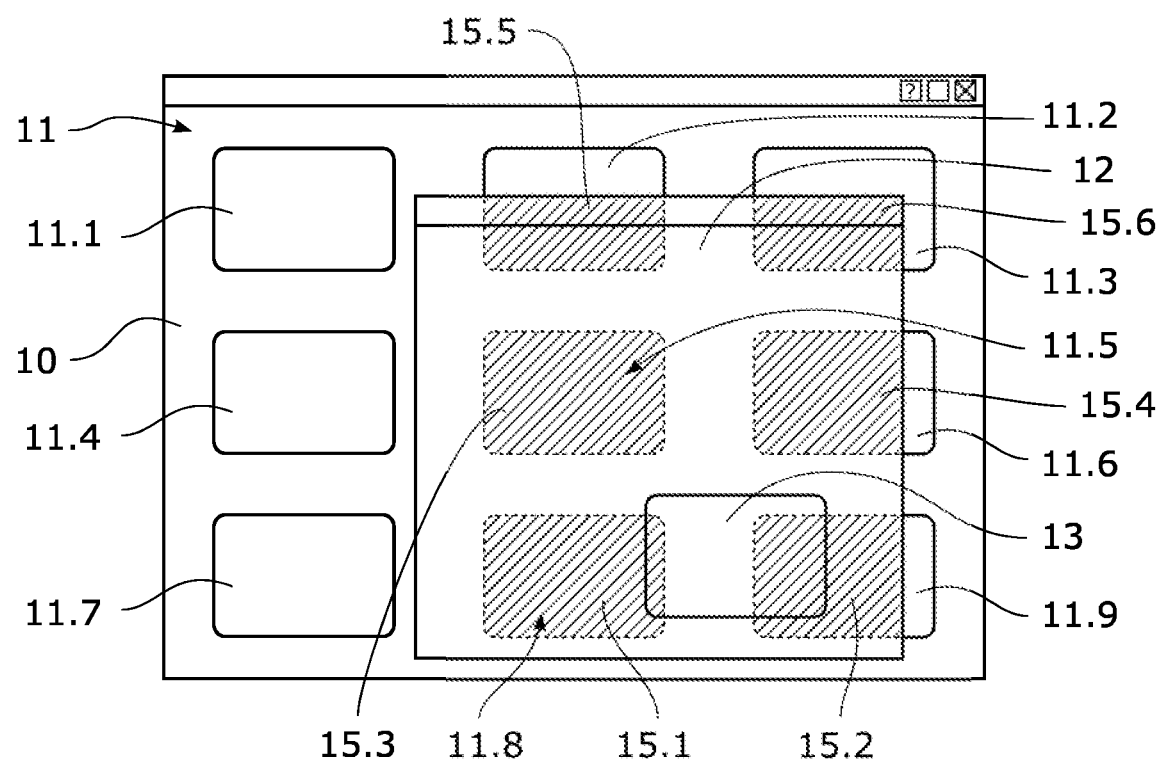

The method proceeds to step S103 to determine which virtual elements 11 of the first graphical user interface 10 will be overlapped by the second graphical user interface 12. As can be seen in FIG. 7, the second user interface 12 overlaps the virtual elements 11.2, 11.3, 11.5, 11.6, 11.8 and 11.9 of the first graphical user interface 10. The controller 3 can also determine the area of each virtual element 11 of the first graphical user interface 10 overlapped by the second graphical user interface 12. As can be seen FIG. 7, the virtual elements 11.5 and 11.8 are fully overlapped by the second graphical user interface 12 as indicated by the areas 15.1 and 15.3 whereas the virtual elements 11.2, 11.3, 11.6 and 11.9 are covered partly by the second graphical user interface 12 as indicated by the areas 15.2, 15.4, 15.5 and 15.6.

Figure 6:
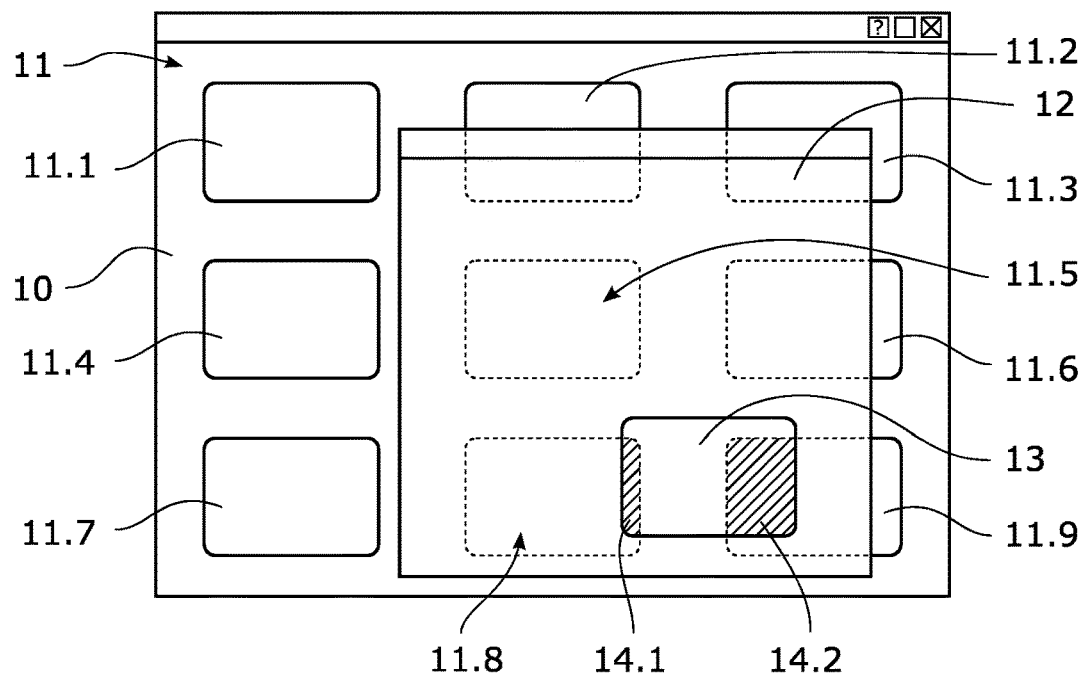

The controller 3 can also determine which virtual elements 11 of the first graphical user interface 10 will be overlapped by the virtual element 13 of the second graphical user interface 12. As can be seen in FIG. 6, the virtual element 13 of the second graphical user interface 12 overlaps the virtual elements 11.8 and 11.9 of the first graphical user interface 10. The controller 3 can also determine the area of each virtual element 11 overlapped by the virtual element 13 of the second graphical user interface 12. As can be seen in FIG. 6, the virtual elements 11.8 and 11.9 are overlapped by the virtual element 13 as indicated by the areas 14.1 and 14.2.

The method proceeds to step S104 to secure the virtual elements 11 being overlapped by the second graphical user interface 12 or by the virtual element 13 of the second graphical user interface 12 against an execution of the corresponding machine function assigned to them. I. e. the controller 3 prevents an execution of the machine function when the user selects the corresponding virtual element on the screen 7. A selection by touching the screen 7 may be recognized by the touch sensitive screen 7 or by the proximity sensor 18 but the controller 3 ignores the selection to avoid the execution of the assigned function.

Instead, the machine functions prevented from execution by selecting the corresponding virtual element are still executable if another input element such as the buttons 9 or the joystick 8 is operated to which the corresponding functions are assigned to.

The method proceeds to step S105 to display the second graphical user interface 12 triggered by the event of step S102 as shown in FIG. 3 or FIG. 5. The second graphical user interface 12 can be a pop-up window.

The method proceeds to step S106 to detect an event for cancelling an overlap of the first graphical user interface 10, respectively the affected virtual elements of the first graphical user interface 10 (as virtual element 11.9 in FIG. 5). For example, the overlap can be cancelled by closing the second graphical user interface 12. So, the event can be an intention of the user to close the second graphical user interface 12 detected by the proximity sensor 18 when the user moves his finger 17 or his hand 16 close to the screen 7. The second graphical user interface 12 can be closed automatically by the control unit 2, for example if a warning message is no longer valid or if the execution of a machine function displayed as a virtual element in the second graphical user interface 12 was finished. If the second graphical user interface 12 displays contents related to a phone call the second graphical user interface 12 can be closed automatically when the call ends. In this case, the event for closing the second graphical user interface 12 can be an external event triggered outside of the console 6, e. g. when the calling party hangs up the call. Finally, other events can be detected which will trigger a closing of the second graphical user interface 12. Due to the event for closing the second graphical user interface 12 the controller 3 closes the second graphical user interface 12.

Instead of closing the second graphical user interface 12 to cancel the overlap of the virtual elements of the first graphical user interface 10 by the second graphical user interface 12, the second graphical user interface 12 can be moved out of the area of the virtual elements. For example, the second graphical user interface 12 can be arranged next to the first graphical user interface 10 to display both graphical user interfaces 10 and 12 side by side on the screen 7.

In the case that the securing of the virtual elements of the first graphical user interface was caused by an overlapping virtual element (e. g. virtual element 13 in FIG. 6) of the second graphical user interface 12 the overlap can be canceled by closing of the second graphical user interface 12 or by moving the overlapping virtual element of the second graphical user interface 12 out of the area of the overlapped virtual elements of the first graphical user interface 10.

After cancelling the overlap the virtual elements of the first graphical user interface 10 having been overlapped by the second graphical user interface 12 become completely visible again so that they can be touched by the user on the screen 7. But the prevention to execute a virtual element having been overlapped by the second graphical user interface 12 or by the virtual element 13 of the second graphical user interface 12 as activated in step S104 is still active. If the user selects a corresponding virtual element of the first graphical user interface 10 to execute an assigned function the selection is ignored by the controller 3 to avoid an execution of the assigned function. Thus, an unintentional execution of a machine function can be prevented at a moment at which the second graphical user interface 12 has been closed automatically just before the user could intentionally touch the second graphical user interface 12 and therefore touches unintentionally the first graphical user interface 10. Since, by way of example, an unintentional execution of the function assigned to the virtual element 11.9 to (un-)fold the right nozzle arm 36 of the agricultural machine 1 could injure a person standing next to the nozzle arm 36 a potential injury can be prevented due to the prevention to execute the function assigned to the corresponding virtual element 11.9 after the overlap of the virtual element 11.9 by the second graphical user interface 12 was cancelled.

Optionally, a second machine function can be assigned to a virtual element of the first graphical user interface 10 to be executed instead of the primary (first) machine function if the virtual element was secured due to an overlap. The controller 3 can enable the second machine function when an overlap of the secured virtual element was cancelled. I. e., if the user selects (unintentionally) a secured virtual element the primary machine function is ignored but the second machine function is executed by the controller 3. The second machine function doesn't pose a threat to anybody. For example, the second machine function can display machine information on the screen 7 or a message that the virtual element selected by the user is secured and an execution of the primary machine function of the virtual element is prevented until an event for enabling the secured virtual element will occur. The second machine function can be enabled as long as the virtual element is secured and will be disabled when the secured virtual element will be enabled to allow the execution of the primary machine function.

Optionally, a first and a second tool (or implement) can be connected with the agricultural machine 1 wherein the primary machine function and the second machine function are assigned to the virtual element if both tools are connected with the agricultural machine 1. The first tool can be controlled by the primary (first) machine function and the second tool can be controlled by the second machine function. Since the controllability of the first and the second function depends on whether the corresponding virtual element is secured or not, the first tool is controllable if the virtual element is unsecured and the second tool is controllable if the virtual element is secured.

The method proceeds to step S107 to detect an event for enabling (unsecuring) the secured virtual elements and for cancelling the prevention to allow the execution of the machine function assigned to these virtual elements. The event for enabling the secured virtual elements can be an elapse of a timer. The timer can be started by the controller 3 just after the detection of the event for closing the second graphical user interface 12 at step S106. The timer can be some milliseconds up to a few seconds, e. g. 400 ms to 2 s. The timer can be adjustable by the user to define a comfortable timer value. Alternatively, the event for enabling the secured virtual elements can be any other event such as an event detected by the proximity sensor 18.

Finally, the method proceeds to step S108 to enable the secured virtual element, e. g. virtual element 11.9, before the method ends with step S109. Then, the prevention is cancelled and the (primary/first) machine function of the virtual element is executable again.

All references cited herein are incorporated herein in their entireties. If there is a conflict between definitions herein and in an incorporated reference, the definition herein shall control.

While the present disclosure has been described herein with respect to certain illustrated aspects of the invention, those of ordinary skill in the art will recognize and appreciate that it is not so limited. Rather, many additions, deletions, and modifications to the illustrated aspects of the invention may be made without departing from the scope of the disclosure as hereinafter claimed, including legal equivalents thereof. In addition, features from one aspects of the invention may be combined with features of another aspects of the invention while still being encompassed within the scope as contemplated by the inventors. Further, aspects of the invention have utility with different and various machine types and configurations.

The invention claimed is:

1. A console for controlling an agricultural machine, the console comprising:
    a screen configured to:
        display a first graphical user interface with at least a one first virtual element for controlling a machine function, and
        display a second graphical user interface comprising at least one second virtual element;
    the console configured to:
        responsive to a determination that the at least one second virtual element of the second graphical user interface at least partially overlaps the at least one first virtual element of the first graphical user interface, rendering the at least one first virtual element of the first graphical user interface inoperable and preventing an execution of the machine function assigned to the at least one first virtual element of the first graphical user interface;
        responsive to a determination that the at least one second virtual element of the second graphical user interface no longer at least partially overlaps the at least one first virtual element of the first graphical user interface, continuing to render the at least one first virtual element of the first graphical user interface inoperable and prevent an execution of the machine function assigned to the at least one first virtual element of the first graphical user interface; and
        responsive to detecting an event external to user interactions with the screen, rendering the at least one first virtual element of the first graphical user interface operable and enabling an execution of the machine function assigned to the at least one first virtual element of the first graphical user interface.

2. The console of claim 1, wherein the event external to user interaction with the screen comprises an elapse of a timer.

3. The console of claim 1, wherein the machine function assigned to the at least one first virtual element comprises controlling a tool connected with the agricultural machine.

4. The console of claim 1, wherein the console is further configured to:
    responsive to a determination that the at least one second virtual element of the second graphical user interface at least partially overlaps the at least one first virtual element assign a second machine function to the at least one first virtual element; and
    responsive to a determination that the at least one second virtual element of the second graphical user interface no longer at least overlaps the at least one first virtual element of the first graphical user interface, enabling an execution of the second machine function assigned to the at least one first virtual element.

5. The console of claim 4, wherein console is further configured to:
    maintain an assignment of the first machine function to the at least one first virtual element if a first tool is connected with the agricultural machine; and
    assign the second machine function to the at least one first virtual element if a second, different tool is connected with the agricultural machine.

6. The console of claim 1, further comprising a proximity sensor for a touchless interaction with the screen, wherein the second graphical user interface is closed when the proximity sensor detects a trigger to close the second graphical user interface.

7. The console of claim 1, further comprising an additional input element to which the machine function of the at least one first virtual element is also assigned to, and wherein the event external to user interactions with the screen comprises an operation of the additional input element.

8. The console of claim 1, wherein determining that the at least one second virtual element of the second graphical user interface no longer at least overlaps the at least one first virtual element of the first graphical user interface comprises determining that the second graphical user interface has been moved relative to the first graphical user interface such that the at least one second virtual element does not overlap with the at least one first virtual element of the first graphical user interface.

9. The console of claim 1, the screen configured to display a second virtual element of the second graphical user interface overlapping at least partially the at least one first virtual element, wherein the execution of the machine function assigned to the at least one first virtual element is prevented if an overlap of the at least one first virtual element by the second virtual element was cancelled by the cancellation of the overlap.

10. A method for preventing an unintended execution of a machine function comprising:
displaying a first graphical user interface comprising at least one first virtual element on a screen;
detecting an event for displaying a second graphical user interface comprising at least one second virtual element;
displaying the second graphical user interface;
determining that the at least one second virtual element of the second graphical user interface at least partially overlaps the at least one first virtual element of the first graphical user interface;
responsive to a determination that the at least one second virtual element of the second graphical user interface at least partially overlaps the at least one first virtual element of the first graphical user interface, rendering the at least one first virtual element of the first graphical user interface inoperable and preventing an execution of the machine function assigned to the at least one first virtual element of the first graphical user interface;
responsive to a determination that the at least one second virtual element of the second graphical user interface no longer at least partially overlaps the at least one first virtual element of the first graphical user interface, continuing to render the at least one first virtual element of the first graphical user interface inoperable and prevent an execution of the machine function assigned to the at least one first virtual element of the first graphical user interface; and
responsive to detecting an event external to user interactions with the screen, rendering the at least one first virtual element of the first graphical user interface operable and enabling an execution of the machine function assigned to the at least one first virtual element of the first graphical user interface.

11. A controller configured to carry out the method of claim 10.

* * * * *